(12) United States Patent
Matsen et al.

(10) Patent No.: US 10,543,647 B2
(45) Date of Patent: Jan. 28, 2020

(54) APPARATUS FOR CURING A COMPOSITE PART LAYUP

(71) Applicant: The Boeing Company, Chicago, IL (US)

(72) Inventors: Marc R. Matsen, Seattle, WA (US); Mark A. Negley, Bellevue, WA (US); Kim E. Peterson, Bellevue, WA (US)

(73) Assignee: The Boeing Company, Chicago, IL (US)

(*) Notice: Subject to any disclaimer, the term of this patent is extended or adjusted under 35 U.S.C. 154(b) by 872 days.

(21) Appl. No.: 14/507,829

(22) Filed: Oct. 7, 2014

(65) Prior Publication Data
US 2015/0020975 A1 Jan. 22, 2015

Related U.S. Application Data

(62) Division of application No. 12/724,473, filed on Mar. 16, 2010, now Pat. No. 8,865,050.

(51) Int. Cl.
| | | |
|---|---|---|
| *B29C 70/34* | (2006.01) | |
| *B29C 35/16* | (2006.01) | |
| *H05B 6/10* | (2006.01) | |
| *H05B 6/14* | (2006.01) | |
| *B29C 35/02* | (2006.01) | |
| *B29C 35/08* | (2006.01) | |
| *B29K 101/10* | (2006.01) | |
| *B29K 105/06* | (2006.01) | |

(52) U.S. Cl.
CPC ........ *B29C 70/345* (2013.01); *B29C 35/0288* (2013.01); *B29C 35/16* (2013.01); *H05B 6/105* (2013.01); *H05B 6/14* (2013.01); *B29C 2035/0811* (2013.01); *B29C 2035/1616* (2013.01); *B29K 2101/10* (2013.01); *B29K 2105/06* (2013.01); *Y10T 428/31504* (2015.04)

(58) Field of Classification Search
CPC ............ B29C 2033/0005; B29C 33/06; B29C 2033/385; B29C 35/0288; B29C 2035/0811; B29C 2035/1616
See application file for complete search history.

(56) References Cited

U.S. PATENT DOCUMENTS

| | | |
|---|---|---|
| 1,910,015 A | 5/1933 | Homand |
| 2,106,614 A | 1/1938 | Lindner |
| 2,317,597 A | 4/1943 | Ford et al. |

(Continued)

FOREIGN PATENT DOCUMENTS

| | | |
|---|---|---|
| FR | 2696676 | 4/1994 |
| GB | 2430177 | 3/2007 |

(Continued)

OTHER PUBLICATIONS

Martinez, Gregory, Chemical Engineering Science, vol. 46, No. 2 (1991), pp. 439-450.

(Continued)

*Primary Examiner* — Matthew J Daniels
(74) *Attorney, Agent, or Firm* — Yee & Associates, P.C.

(57) ABSTRACT

A composite part layup is cured using a set of tools adapted to hold the layup and which include at least one tool face contacting the layup. Means are provided for heating the tool face to cure the part layup, and for selectively cooling sections of the tool face.

20 Claims, 7 Drawing Sheets

(56) References Cited

U.S. PATENT DOCUMENTS

| | | |
|---|---|---|
| 2,993,786 A | 7/1961 | Roboff et al. |
| 3,413,392 A | 11/1968 | Meadows |
| 3,454,685 A | 7/1969 | Roy et al. |
| 3,650,042 A | 3/1972 | Boerger et al. |
| 3,763,293 A | 10/1973 | Nussbaum |
| 4,182,397 A | 1/1980 | Schmucker et al. |
| 4,217,325 A | 8/1980 | Colby |
| 4,327,045 A | 4/1982 | Nishikawa et al. |
| 4,482,306 A | 11/1984 | Hahn |
| 4,527,970 A | 7/1985 | Murley |
| 4,596,694 A | 6/1986 | Rozmus |
| 4,597,730 A | 7/1986 | Rozmus |
| 4,636,341 A | 1/1987 | Murley |
| 4,683,018 A | 7/1987 | Sutcliffe et al. |
| 4,724,123 A | 2/1988 | Rozmus, Jr. |
| 4,761,262 A | 8/1988 | Ogata et al. |
| 4,940,563 A | 7/1990 | Kromrey |
| 4,983,341 A | 1/1991 | Kromrey |
| 4,983,345 A | 1/1991 | Kromrey |
| 5,009,687 A | 4/1991 | Kromrey |
| 5,037,592 A | 8/1991 | Erienbach |
| 5,049,053 A | 9/1991 | Tabaru |
| 5,049,329 A | 9/1991 | Allaire et al. |
| 5,064,597 A | 11/1991 | Kim |
| 5,158,132 A * | 10/1992 | Guillemot ............... B29C 33/02 100/320 |
| 5,188,692 A | 2/1993 | Horvath |
| 5,225,015 A | 7/1993 | Allaire et al. |
| 5,338,372 A | 8/1994 | Tabaru |
| 5,338,497 A | 8/1994 | Murrary et al. |
| 5,410,132 A | 4/1995 | Gregg et al. |
| 5,413,661 A | 5/1995 | Spengler et al. |
| 5,483,043 A | 1/1996 | Sturman, Jr. et al. |
| 5,529,479 A | 6/1996 | Souders |
| 5,530,227 A | 6/1996 | Matsen et al. |
| 5,591,369 A | 1/1997 | Matsen et al. |
| 5,591,370 A | 1/1997 | Matsen et al. |
| 5,592,988 A | 1/1997 | Meroni et al. |
| 5,599,472 A | 2/1997 | Brown et al. |
| 5,645,744 A | 7/1997 | Matsen et al. |
| 5,683,608 A | 11/1997 | Matsen et al. |
| 5,705,794 A | 1/1998 | Gillespie et al. |
| 5,728,309 A | 3/1998 | Matsen et al. |
| 5,747,179 A | 5/1998 | Matsen et al. |
| 5,772,946 A | 6/1998 | Kaminaga et al. |
| 5,808,281 A | 9/1998 | Matsen et al. |
| 5,885,504 A | 3/1999 | David et al. |
| 5,989,008 A | 11/1999 | Wytkin |
| 6,040,563 A | 3/2000 | Matsen et al. |
| 6,149,844 A | 11/2000 | Graham |
| 6,211,497 B1 | 4/2001 | Matsen et al. |
| 6,221,813 B1 | 4/2001 | Riedel et al. |
| 6,283,195 B1 | 9/2001 | Chandley et al. |
| 6,284,089 B1 | 9/2001 | Anderson et al. |
| 6,299,819 B1 | 10/2001 | Han |
| 6,310,327 B1 | 10/2001 | Moore et al. |
| 6,312,628 B1 * | 11/2001 | Wieder ............... B29C 45/7306 264/328.16 |
| 6,485,585 B2 | 11/2002 | Krajewski |
| 6,524,511 B1 | 2/2003 | Ueki et al. |
| 6,528,771 B1 * | 3/2003 | Matsen ............... H05B 6/06 219/634 |
| 6,529,796 B1 | 3/2003 | Kroeger et al. |
| 6,565,792 B2 | 5/2003 | Hemphill |
| 6,565,942 B2 | 5/2003 | Anderson et al. |
| 6,566,635 B1 | 5/2003 | Matsen et al. |
| 6,653,608 B1 | 11/2003 | Matsen et al. |
| 6,747,253 B1 | 6/2004 | Firth et al. |
| 6,812,271 B2 | 11/2004 | Swartz et al. |
| 6,840,750 B2 | 1/2005 | Thrash et al. |
| 6,855,917 B2 | 2/2005 | Matsen et al. |
| 6,884,966 B2 | 4/2005 | Coleman et al. |
| 6,897,419 B1 | 5/2005 | Brown et al. |
| 6,906,300 B2 | 6/2005 | Brown et al. |
| 6,914,225 B2 | 7/2005 | Fischer et al. |
| 6,979,807 B2 | 12/2005 | Anderson et al. |
| 6,991,446 B2 | 1/2006 | Byma et al. |
| 7,024,897 B2 | 4/2006 | Pfaffmann et al. |
| 7,037,465 B2 | 5/2006 | Ogawa |
| 7,102,112 B2 | 9/2006 | Anderson et al. |
| 7,109,451 B2 | 9/2006 | Brown et al. |
| 7,159,836 B2 | 1/2007 | Parks et al. |
| 7,269,986 B2 | 9/2007 | Pfaffmann et al. |
| 7,351,054 B2 | 4/2008 | Bachan |
| 7,419,631 B2 | 9/2008 | Guichard et al. |
| 7,497,981 B2 | 3/2009 | Graham |
| 7,866,969 B2 | 1/2011 | Ruiz et al. |
| 7,905,128 B2 | 3/2011 | Matsen et al. |
| 8,017,059 B2 | 9/2011 | Matsen et al. |
| 8,268,226 B2 | 9/2012 | Vander Wel et al. |
| 8,343,402 B1 | 1/2013 | Matsen et al. |
| 8,372,327 B2 | 2/2013 | Matsen et al. |
| 8,375,758 B1 | 2/2013 | Matsen et al. |
| 8,383,998 B1 | 2/2013 | Matsen et al. |
| 8,480,823 B1 | 7/2013 | Matsen et al. |
| 8,556,619 B2 | 10/2013 | Matsen et al. |
| 8,708,691 B2 | 4/2014 | Matsen et al. |
| 8,865,050 B2 | 10/2014 | Matsen et al. |
| 2002/0025423 A1 | 2/2002 | Dreher et al. |
| 2002/0050667 A1 | 5/2002 | Swartz et al. |
| 2002/0117238 A1 | 8/2002 | Krajewski |
| 2002/0121721 A1 | 9/2002 | Byma et al. |
| 2002/0157785 A1 | 10/2002 | Anderson et al. |
| 2002/0162940 A1 * | 11/2002 | Frul ............... B29C 33/04 249/79 |
| 2002/0167119 A1 | 11/2002 | Hemphill |
| 2002/0185785 A1 | 12/2002 | Thrash et al. |
| 2004/0058027 A1 | 3/2004 | Guichard et al. |
| 2004/0074889 A1 | 4/2004 | Coleman et al. |
| 2004/0101429 A1 | 5/2004 | Ogawa |
| 2004/0113315 A1 | 6/2004 | Graham |
| 2004/0194424 A1 | 10/2004 | Frost et al. |
| 2005/0035116 A1 | 2/2005 | Brown et al. |
| 2005/0045303 A1 | 3/2005 | Itoyama et al. |
| 2005/0069600 A1 | 3/2005 | Scolamiero et al. |
| 2005/0145309 A1 | 7/2005 | Coleman et al. |
| 2005/0151555 A1 | 7/2005 | Lewis et al. |
| 2005/0205568 A1 | 9/2005 | Brown et al. |
| 2005/0263673 A1 | 12/2005 | Bachan |
| 2006/0102316 A1 | 5/2006 | Itoyama et al. |
| 2006/0131473 A1 | 6/2006 | Bachan |
| 2006/0233907 A1 | 10/2006 | Ruiz et al. |
| 2007/0000602 A1 | 1/2007 | Sprague |
| 2007/0160822 A1 | 7/2007 | Bristow et al. |
| 2007/0241482 A1 | 10/2007 | Giller et al. |
| 2009/0071217 A1 * | 3/2009 | Matsen ............... B21D 37/16 72/342.3 |
| 2009/0074905 A1 * | 3/2009 | Matsen ............... B29C 33/06 425/547 |
| 2010/0018271 A1 | 1/2010 | Matsen et al. |
| 2010/0065552 A1 | 3/2010 | Matsen et al. |
| 2011/0006460 A1 | 1/2011 | Vander Wel et al. |
| 2013/0134154 A1 | 5/2013 | Matsen et al. |

FOREIGN PATENT DOCUMENTS

| | | |
|---|---|---|
| WO | WO2009036473 | 3/2009 |
| WO | WO2011115716 | 9/2011 |

OTHER PUBLICATIONS

International Search Report, dated Jun. 12, 2009, regarding Application No. PCT/US2008/077039 (WO2009036473), 5 pages.
International Search Report, dated Jun. 6, 2011, regarding Application No. PCT/US2011/024843 (WO2011115716), 3 pages.
Office Action, dated Aug. 17, 2009, regarding U.S. Appl. No. 11/854,733, 13 pages.
Final Office Action, dated Mar. 1, 2010, regarding U.S. Appl. No. 11/854,733, 13 pages.
Office Action, dated Jul. 19, 2010, regarding U.S. Appl. No. 11/854,733, 10 pages.

(56) References Cited

OTHER PUBLICATIONS

Final Office Action, dated Feb. 1, 2011, regarding U.S. Appl. No. 11/854,733, 5 pages.
Notice of Allowance, dated May 19, 2011, regarding U.S. Appl. No. 11/854,733, 5 pages.
Office Action, dated Nov. 5, 2009, regarding U.S. Appl. No. 11/859,098, 27 pages.
Final Office Action, dated May 25, 2010, regarding U.S. Appl. No. 11/859,098, 21 pages.
Office Action, dated Dec. 22, 2011, regarding U.S. Appl. No. 11/859,098, 18 pages.
Notice of Allowance, dated Jun. 21, 2012, regarding U.S. Appl. No. 11/859,098, 8 pages.
Notice of Allowance, dated Oct. 3, 2012, regarding U.S. Appl. No. 11/859,098, 21 pages.
Office Action, dated May 29, 2012, regarding U.S. Appl. No. 12/625,354, 20 pages.
Notice of Allowance, dated Sep. 17, 2012, regarding U.S. Appl. No. 12/625,354, 8 pages.
Office Action, dated Jan. 30, 2012, regarding U.S. Appl. No. 13/177,403, 17 pages.
Final Office Action, dated Jul. 5, 2012, regarding U.S. Appl. No. 13/177,403, 13 pages.
Office Action, dated Mar. 4, 2013, regarding U.S. Appl. No. 13/177,403, 26 pages.
Notice of Allowance, dated Jun. 6, 2013, regarding U.S. Appl. No. 13/177,403, 19 pages.
Office Action, dated Sep. 23, 2013, regarding U.S. Appl. No. 13/722,670, 36 pages.
Notice of Allowance, dated Dec. 10, 2013, regarding U.S. Appl. No. 13/722,670, 11 pages.
Office Action, dated Sep. 28, 2012, regarding U.S. Appl. No. 12/817,459, 13 pages.
Notice of Allowance, dated Mar. 11, 2013, regarding U.S. Appl. No. 12/817,459, 8 pages.
Notice of Allowance, dated Jun. 26, 2012, regarding U.S. Appl. No. 12/835,207, 10 pages.
Office Action, dated Nov. 8, 2011, regarding U.S. Appl. No. 12/724,473, 15 pages.
Final Office Action, dated Mar. 29, 2012, regarding U.S. Appl. No. 12/724,473, 13 pages.
Notice of Allowance, dated Jun. 13, 2014, regarding U.S. Appl. No. 12/724,473, 8 pages.
State Intellectual Property Office of PRC Notification of Third Office Action, dated May 20, 2015, regarding Application No. 201180014022.8, 11 pages.

* cited by examiner

APPARATUS FOR CURING A COMPOSITE PART LAYUP

CROSS REFERENCE TO RELATED APPLICATIONS

This application is a divisional application of U.S. patent application Ser. No. 12/724,473, filed Mar. 16, 2010 and issued as U.S. Pat. No. 8,865,050 on Oct. 21, 2014. This application is related to co-pending U.S. patent application Ser. No. 11/854,733, filed on Sep. 13, 2007 and issued as U.S. Pat. No. 8,017,059 on Sep. 12, 2011; Ser. No. 11/859,098 filed on Sep. 21, 2007 and issued as U.S. Pat. No. 8,372,327 on Feb. 12, 2013; and Ser. No. 12/625,354, filed on Nov. 24, 2009 and issued as U.S. Pat. No. 8,343,402 on Jan. 1, 2013, all of which applications are incorporated by reference herein in their entireties.

TECHNICAL FIELD

This disclosure generally relates to techniques and equipment used to cure composite parts, and deals more particularly with a method and apparatus for controlling the temperature tools used to cure a composite part layup.

BACKGROUND

Composite part layups may be cured using tools that are heated to a predetermined temperature required to cure the layup, often referred to as the "cure temperature". In some cases, the layup is cured within a matched set of tools that compress the layup during the cure process in order to produce a consolidated, net-shaped part. The cure process is sometimes complicated by part layups that use certain types of binder resins, such as thermosetting resins that undergo exothermic reactions during the cure process. The exothermic reactions generate heat that may elevate the temperature of the layup above the cure temperature. Because of the relatively large thermal mass of conventional cure tools, the heat added to the layup by an exothermic reaction may not be quickly or easily removed, which may result in less than optimal curing of the part layup. The problem of extracting excess heat caused by exothermic reactions in a layup may be more challenging in part layups that have a combination of both relatively thin and thick areas, since an attempt to reduce the temperature of the layup in thicker areas may reduce the temperature of the layup in thinner areas to a level that is below the desired cure temperature.

In the past, attempts to control part layup temperature variations due to exothermic reactions have been limited to using relatively slow temperature ramp-up profiles, however this approach may be time consuming and may reduce throughput in production environments. Additionally, in some applications, it may be difficult to maintain a relatively slow heating rate, and any error in the temperature during the temperature ramp-up may result in less than optimal curing of the part layup.

Accordingly, there is a need for a method and apparatus for curing a composite part layup that allows temperature control over individual areas of the part in order to compensate for the localized effects of exothermic reactions, while avoiding the need for slow thermal cycles used for curing.

SUMMARY

The disclosed method and apparatus employ induction heating of matched laminated tools having smart susceptors for curing composite part layups, especially those employing thermosetting resin binders which may generate exothermic reactions during curing. Relatively precise and rapid temperature control over the part layup is achieved through the use of tailored cooling of susceptor faces and tooling that has reduced thermal mass and inertia. Tailored cooling of the susceptors removes excess heat in localized areas of the susceptors caused by the exothermic reactions in the resin component. Tailored cooling of the susceptors is achieved by applying a coolant directly onto selected areas of the susceptors in order to maintain substantially the entire area of the susceptor tool faces at a substantially uniform temperature.

According to one disclosed embodiment, apparatus is provided for curing a composite part. The apparatus includes a set of tools adapted to hold a composite part layup and including at least one tool face contacting the part layup. The apparatus further includes means for heating the tool face to cure the part layup and means coupled with each of the tools for selectively cooling sections of the tool face. The apparatus may further include means for sensing the temperature within each of a plurality of sections on the tool face, and a controller for controlling the heating means based on the temperatures sensed by a sensing means. The temperature sensing means may include a plurality of thermocouples coupled to the tool face within each of the sections where the temperature is to be sensed. The means for cooling of the sections of the tool faces may include a plurality of nozzles adapted to be coupled with a source of a coolant for directing the fluid onto the tool face.

According to another disclosed embodiment, apparatus is provided for curing a composite thermoset resin part layup having varying thickness. The apparatus includes a tool having a tool face adapted to contact the part layup, and a heating system for heating the tool face to a temperature sufficient to cure the part layup. A plurality of sensors are provided for respectively sensing the temperature of the tool face within each of a plurality of sections on the tool face. A cooling system is provided for cooling selected sections of the tool face and a controller is provided for selecting the sections of the tool face to be cooled based on the sensed temperatures. The tool includes a plurality of spaced apart laminations and a susceptor having a front side contacting the part layup and a backside connected to the laminations. The cooling system includes means for individually cooling each of a plurality of sections on the backside of the susceptor. The cooling system may include a plurality of nozzles respectively located at each of the sections on the backside of the susceptor, along with a source of coolant fluid and a plurality of valves operated by the controller for controlling the flow of coolant fluid from the source to each the nozzles. The nozzles may be located between at least certain of the laminations and are oriented to direct the coolant fluid onto the backside of the susceptors.

According to another embodiment, a method is provided of controlling the temperature of a tool face used to cure a composite part layup. The method includes heating the tool face and sensing the temperature of the tool face at each of a plurality of section of the tool face. The method also includes cooling selected sections of the tool face based on the sensed temperatures. The method may further comprise using a programmed controller to determine the section of the tool face that need to be cooled and to direct the cooling system to cool the tool face within the determined sections.

According to another embodiment, a method is provided of curing a thermoset resin composite part having a varying thickness. The method includes placing the part layup in contact with a cure tool and heating the part layup to a cure temperature by heating the backside of the face of the tool in contact with the layup. The method further includes sensing sections on the tool face where the temperature of the tool exceeds the cure temperature due to heat produced by an exothermic reaction of the thermoset resins in areas of the part layup having greater thickness. The method also includes directing a coolant fluid onto the backside of the tool in sections where the temperature of the tool exceeds the cure temperature. The method may include using a programmed controller to automatically select the sections on the tool where the temperatures exceed the cure temperature.

The disclosed embodiments satisfy the need for a method and apparatus of controlling the temperature of a cure tool which tailors the temperature by cooling selected areas of the tool where added heat may be generated by exothermic reactions in the part layup, thereby allowing more even and consistent heating of the layup at the cure temperature without the need for slow thermal cycle times.

BRIEF DESCRIPTION OF THE ILLUSTRATIONS

DETAILED DESCRIPTION

Figure 1:
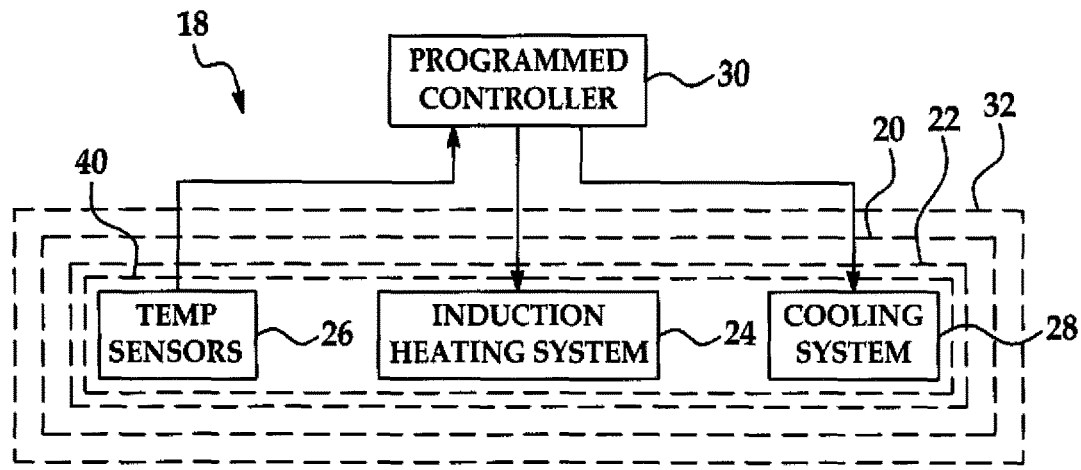
FIG. 1 is an illustration of a functional block diagram of apparatus for curing a composite part layup according to a disclosed embodiment.
Figure 2:
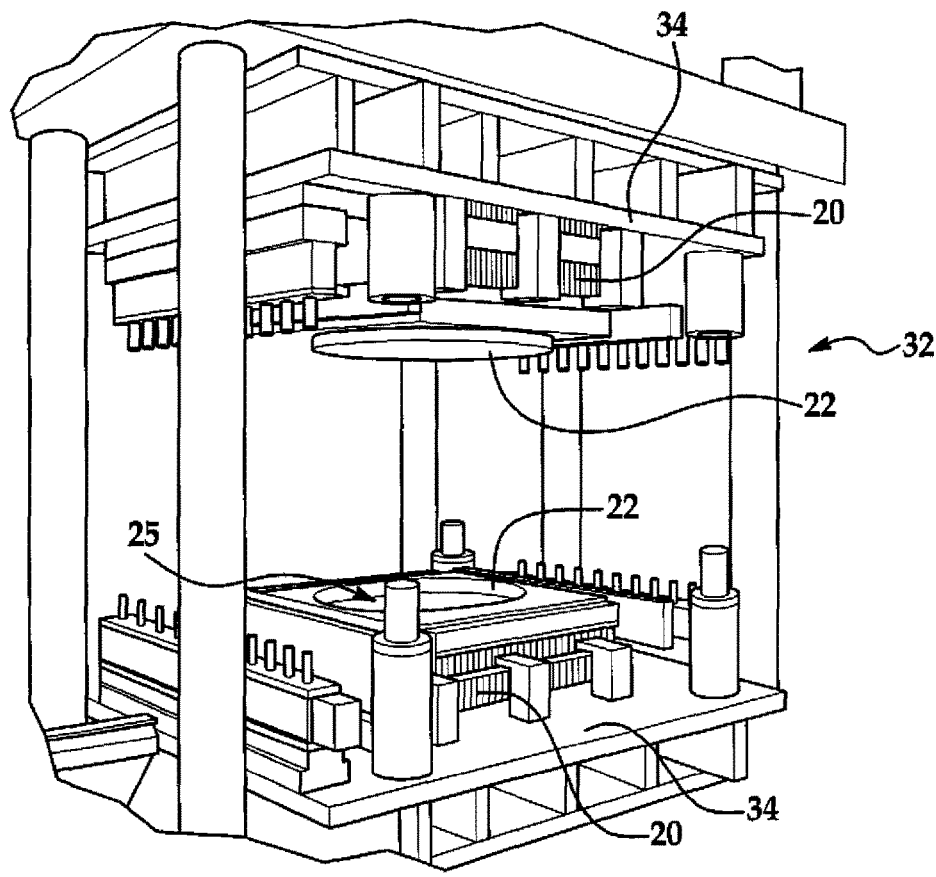
FIG. 2 is an illustration of a perspective view of a press having matched tools used to consolidate and cure a composite part layup.
Figure 3:
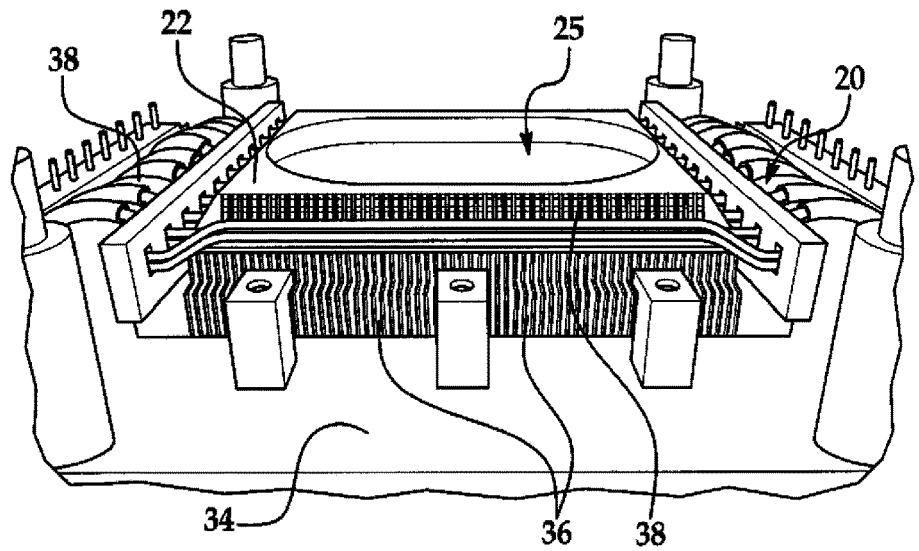
FIG. 3 is an illustration of an isometric view of one of the tools shown in FIG. 2.

Referring first to FIG. 1, the disclosed embodiments provide a method and related apparatus 18 for curing a composite part layup 40, including composites using resin binders that may undergo an exothermic reaction during curing which produces heat, hereinafter sometimes referred to as "reaction heat". The apparatus 18 broadly includes a set of matched tools 20 each having a susceptor 22 that engages the part layup 40. The tools 20 are installed in a press 32 and are heated by an induction heating system 24 in order to cure and consolidate the layup 40. Holding the layup 40 within the set of matched, solid tools 20 during curing may reduce or eliminate the loss of dimensional stability during processing. Sensors 26 coupled with the susceptors 22 function to sense the temperature at a plurality of locations over the susceptors 22 in order to determine whether there may be areas on the susceptors 22 that exceed the cure temperature due to the reaction heat caused by an exothermic reaction in the layup 40.

A cooling system 28 individually cools those sections of the susceptors 22 that may overheat (above the desired cure temperature) because of the reaction heat or for other reasons. By selectively cooling overheated areas of the susceptors 22, a substantially uniform cure temperature may be maintained across substantially the entire area of the susceptors 22. A programmed controller 30, which may comprise a programmable logic controller (PLC) or a PC (personal computer) may be used to control the heating system 24 in order to heat the tools 20 according to a preprogrammed temperature cycle. The controller 30 also controls the cooling system 28 based on the temperatures sensed at multiple locations on the susceptors 22.

Referring now to FIGS. 2-9, the matched tools 20 may be mounted on the platens 34 of the press 23 (FIGS. 2 and 3) which close the tools 20 to compress the part layup 40 during curing. The susceptors 22 have contoured front tool faces 22a (see FIG. 5) forming a mold cavity 25 substantially matching the shape of the part to be formed, and backsides 22b that are attached to and supported by a plurality of stacked, spaced apart laminations 36. The laminations 36 may be formed of materials that may or may not be thermally conductive, such as, without limitation, stainless steel. The laminations 36 function primarily to support the susceptors 22 and to provide a means for mounting the susceptors 22 in the press 32. The tools 20 further include a plurality of tubes 38 which deliver coolant fluid to selected areas or sections of the backside 22b of the susceptors 22, as will be discussed below in more detail.

The susceptors 22 may comprise a device similar to that disclosed in U.S. Pat. No. 6,528,771 issued Mar. 4, 2003, and U.S. Patent Application Serial Numbers 854,733 filed Sep. 13, 2007 and 859,098 filed Sep. 21, 2007, both of which patent and applications are incorporated by reference herein. Susceptors of this type, which are sometimes referred to as "smart" susceptors, may be formed of a lightweight, electrically conductive metal such as a ferromagnetic metal alloy, and may also have a high thermal conductivity in order to provide efficient and thorough heating of the part layup 40. The susceptors 22 are heated by an electromagnetic flux field (not shown) generated by inductive coils 48 (FIGS. 5 and 6) that surround the part layup 40. An alternating electrical signal applied to inductive coils 48 induces a current to flow through the susceptors 22 which heats the susceptors to their Curie temperature, which may be selected to correspond to the desired cure temperature.

Figure 4:
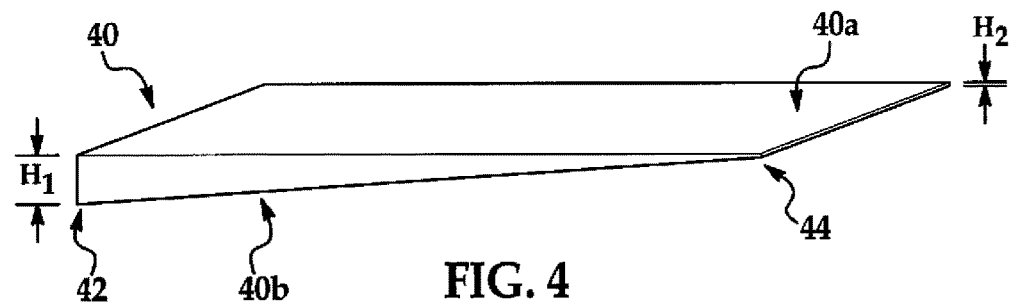
FIG. 4 is an illustration of a perspective view of a typical composite part layup having a varying thickness.

In some applications, the part layup 40 may have an uneven thickness across its area. For example and without limitation, the part layup 40 shown in FIG. 4 has a tapered cross section along its length which results in the layup having a thickness $H_1$ at one end 42 which is substantially greater than the thickness $H_2$ at the opposite end 44. The part layup 40 shown in FIG. 4 is merely exemplary of a wide range of part layups that may have varying thicknesses over their areas due to part configurations that are unique to the particular application.

As previously mentioned, the composite part layup 40 may include a resin binder such as a thermosetting resin which may produce exothermic reactions during the curing process that produce reaction heat which is conducted to the susceptors 22. The amount of reaction heat generated in the thicker areas 42 of the layup 40 may be greater than that generated in the thinner areas 44. This additional reaction heat may not only increase the temperature of the layup 40 and thus of the susceptors 22, to a level that is above the desired cure temperature, but may do so on a localized basis. Indeed, due to the localization of the reaction heat related to thickness variations in the layup 40, some areas of the layup 40 may remain at the desired cure temperature, while other areas may experience temperatures that are substantially above the cure temperature.

Figure 5:
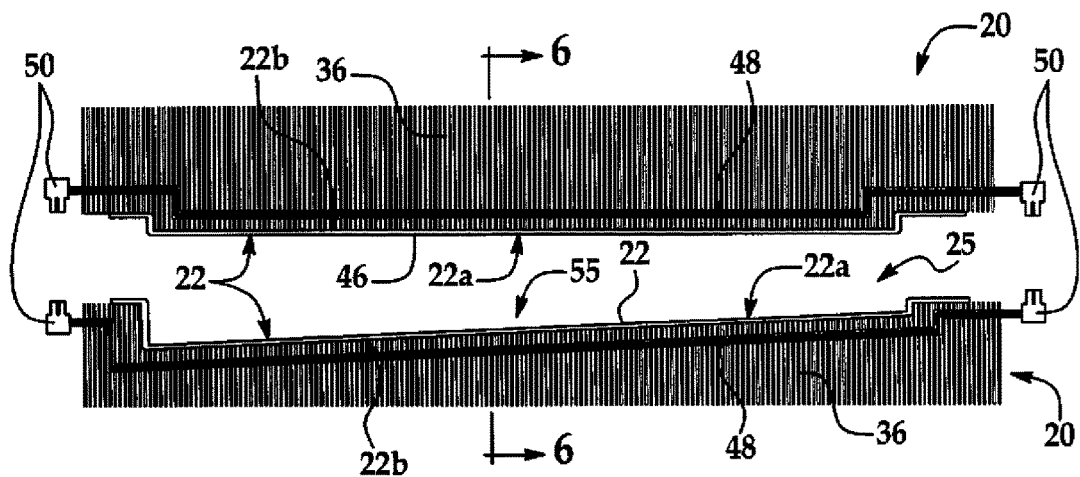
FIG. 5 is an illustration of a cross sectional view of the matched tools shown in FIG. 3, separated in readiness to receive the part layup shown in FIG. 3.
Figure 6:
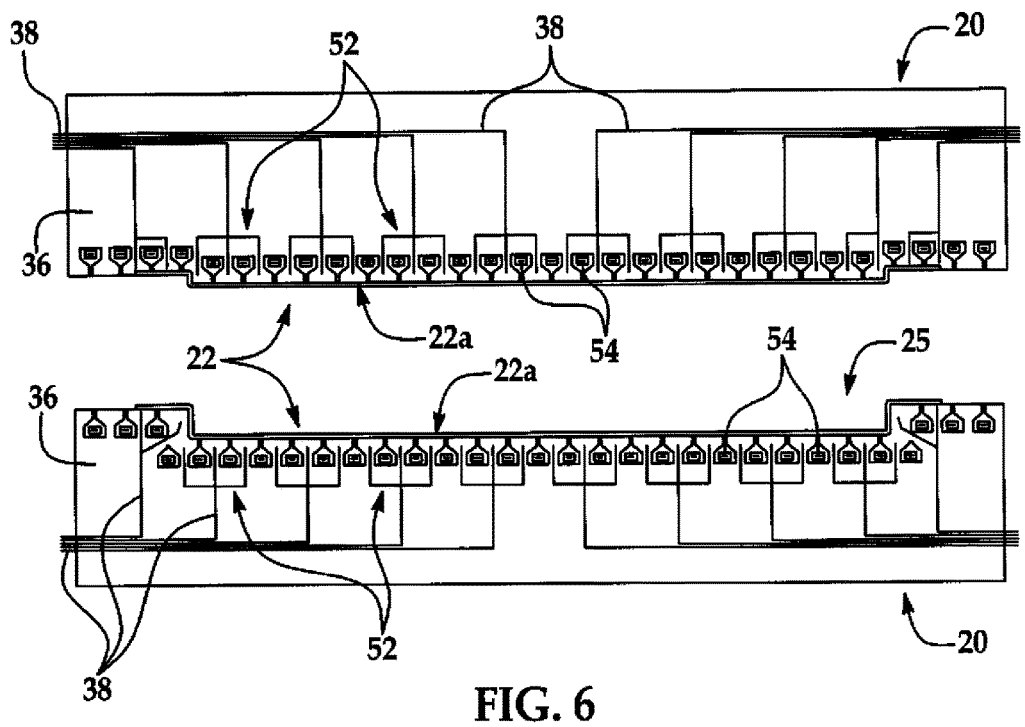
FIG. 6 is an illustration of a sectional view taken along the line 6-6 in FIG. 5.
Figure 7:
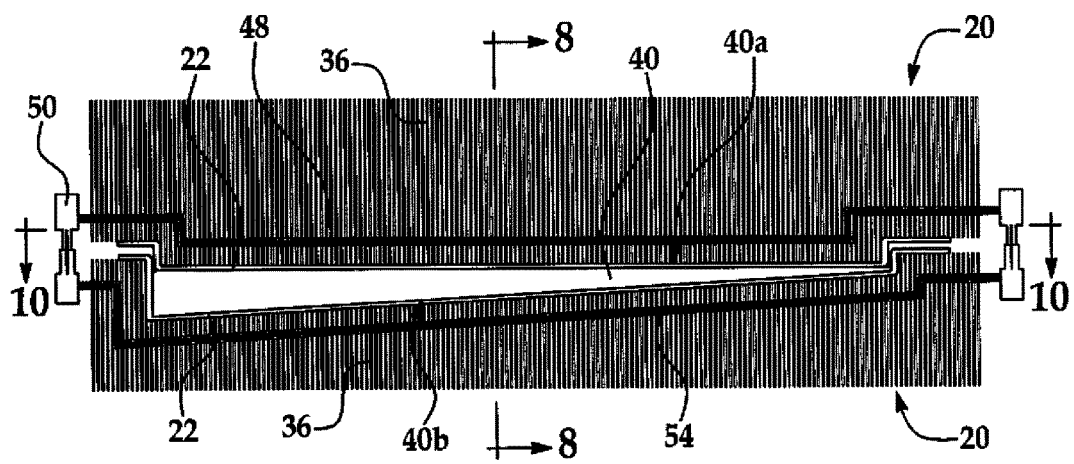
FIG. 7 is an illustration similar to FIG. 5 but showing the tools in their closed position with the part layup therein.

As discussed above, each of the matched tools 20 comprises a plurality of laminations 36 mechanically connected to the backside 22b of a corresponding susceptor 22. As best seen in FIGS. 5 and 7, in the illustrated example, one of the susceptors 22 has a front side face 22a configured to contact a substantially flat top surface 40a of the part layup 40. Similarly, the other susceptor 22 includes a front side face 22a that is contoured to contact the bottom face 40b of the part layup 40. As best seen in FIGS. 5-8, the induction coils 48 extend transversely through the laminations 36, substantially parallel to the susceptors 22, and are spaced relatively closely from the backside 22b of the susceptors 22. The induction coils 48 are adapted to be connected with each other via connectors 50 when the tools 20 are in their closed position as shown in FIG. 7. Although not shown in the Figures, the induction coils 48 are coupled with an electrical power source in order to produce an electric flux that is inductively coupled with the susceptors 22 to heat the latter to the Curie temperature of the susceptor 22, which, as previously mentioned, may be selected to substantially match the desired cure temperature of the part layup 40.

As best seen in FIG. 7, when the part layup 40 is placed in the tool cavity 25 (FIG. 5) and the tools 20 are closed, the tool faces 22a of the susceptors 22 contact and compress the part layup 40 which is heated to the desired cure temperature by the inductively heated susceptors 22. As discussed above, in some applications, localized overheating of areas of the part layup 40 may occur due to the generation of exothermic reaction heat. In order to control this localized overheating and thereby maintain the temperature of the layup 40 at the desired cure temperature over substantially its entire area, the cooling system 28 (FIG. 1) is employed to selectively cool the susceptors 22 and thus the layup 40, in the overheated areas.

Figure 8:
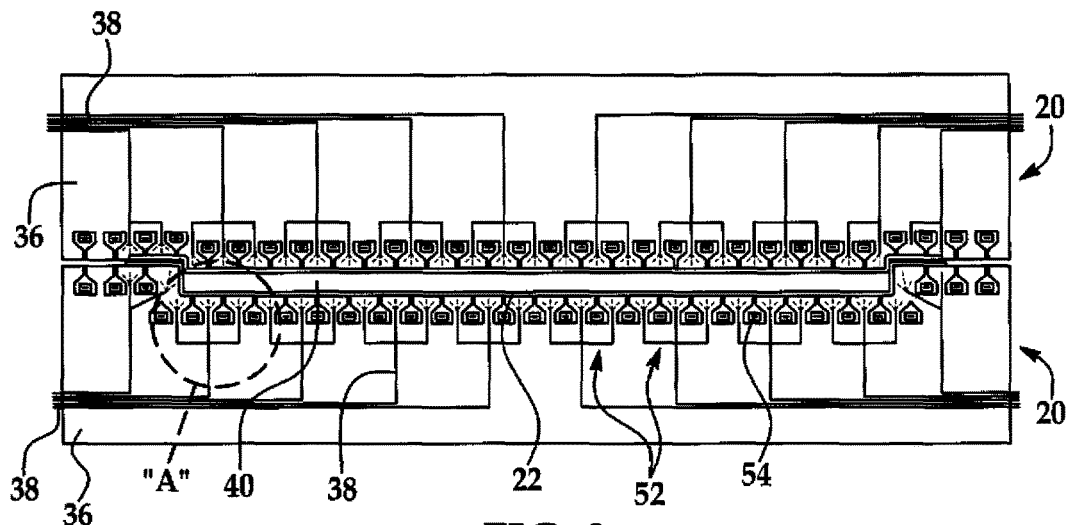
FIG. 8 is an illustration of a sectional view taken along the line 8-8 in FIG. 7.
Figure 9:
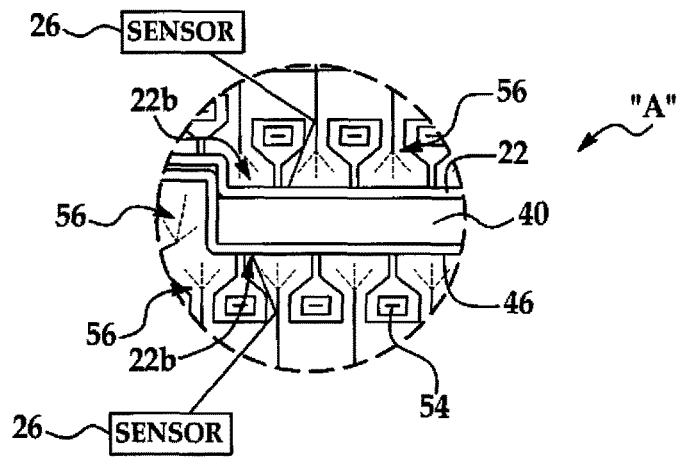
FIG. 9 is an illustration of the area designated as "A" in FIG. 8, better showing the spray nozzles in relation to the backside of the susceptors.

Referring now particularly to FIGS. 8 and 9, the cooling system 28 (FIG. 1) includes a plurality of tubes 38 that are adapted to carry a coolant fluid to manifolds 52 which distribute the fluid to nozzles 56 located between the laminations 36, in proximity to the backside 22b of each of the susceptors 22. The coolant fluid may comprise water or other suitable liquid, a gas or an aerosol. The nozzles 56 are oriented so as to spray the coolant fluid at a controlled rate onto the backside 22b surface of the susceptors 22, thereby cooling the area of the susceptor 22 that is contacted by the coolant fluid.

In order to determine which areas of the susceptors may have overheated, i.e., exceeded a preselected threshold temperature, a plurality of temperature sensors are connected to the backside 22b of each of the susceptors 22, only two of these sensors 26 being indicated in FIG. 9. The threshold temperature at which cooling is initiated may be a preselected level above the desired cure temperature so that the temperature of the layup 40 over substantially its entire area is controlled to remain within a range that provides optimal curing of the layup.

Figure 10:
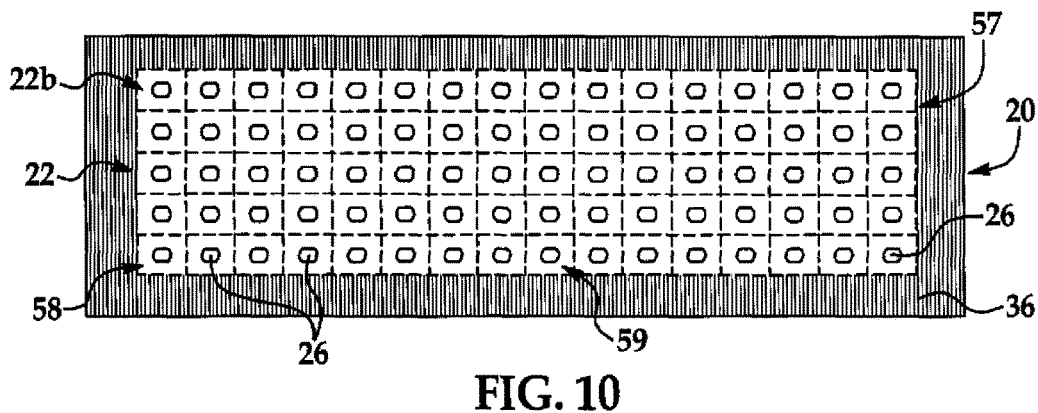
FIG. 10 is an illustration of a sectional view taken along the line 10-10 in FIG. 7, but diagrammatically indicating the location of thermocouples used to sense the temperature of the tool face at each of these locations.

FIG. 10 illustrates a typical layout of the temperature sensors 26 in which the backside 22b of the susceptors 22 is divided into predefined sections 58, indicated by broken lines, that are arranged in a grid pattern 57. As will be discussed below, each of the sections 58 of the backside 22b may be independently and selectively cooled by the cooling system 28. In this example, a single sensor 26 is connected with the backside 22b of susceptor 22 at a central location 59 within each of the sections 58. However, the sensors 26 may be placed at other locations within each section 58, and/or more than one sensor 26 may be placed in each section 58. A wide variety of other layout patterns for the sensors 26 and/or the sections 58 are possible.

Figure 11:
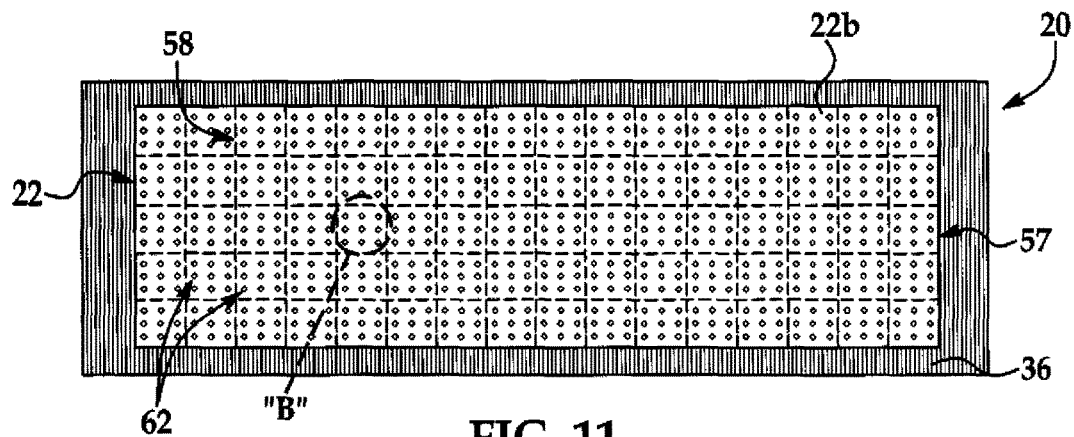
FIG. 11 is an illustration similar to FIG. 10 but showing the points of impingement of the coolant on the backside of the susceptor.
Figure 12:
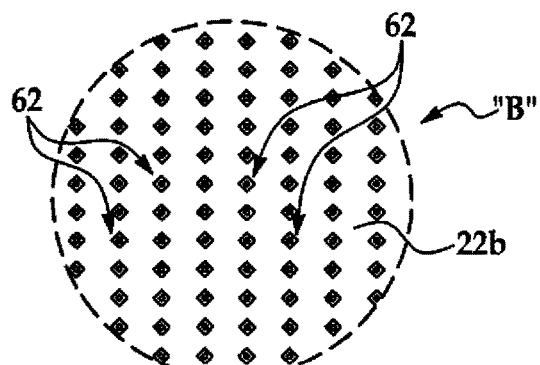
FIG. 12 is an illustration of the area designated as "B" in FIG. 11.

FIGS. 11 and 12 illustrate the backside 22b of one of the susceptors 22, also showing the predefined sections in broken lines as well as areas 62 of impingement of the coolant fluid on the backside 22b of the susceptor 22 within each of the sections 58. The multiple areas 62 of coolant impingement in each section 58 may be produced by multiple nozzles 56 in the section 58 or by a single nozzle 56 having multiple nozzle openings (not shown). In other embodiments, it is possible that adequate cooling in a section 58 may be achieved by a single nozzle 56 in the section 58 that applies coolant at a single point of impingement on the susceptor 22. Other means for cooling the individual sections 58 may be possible.

Figure 13:
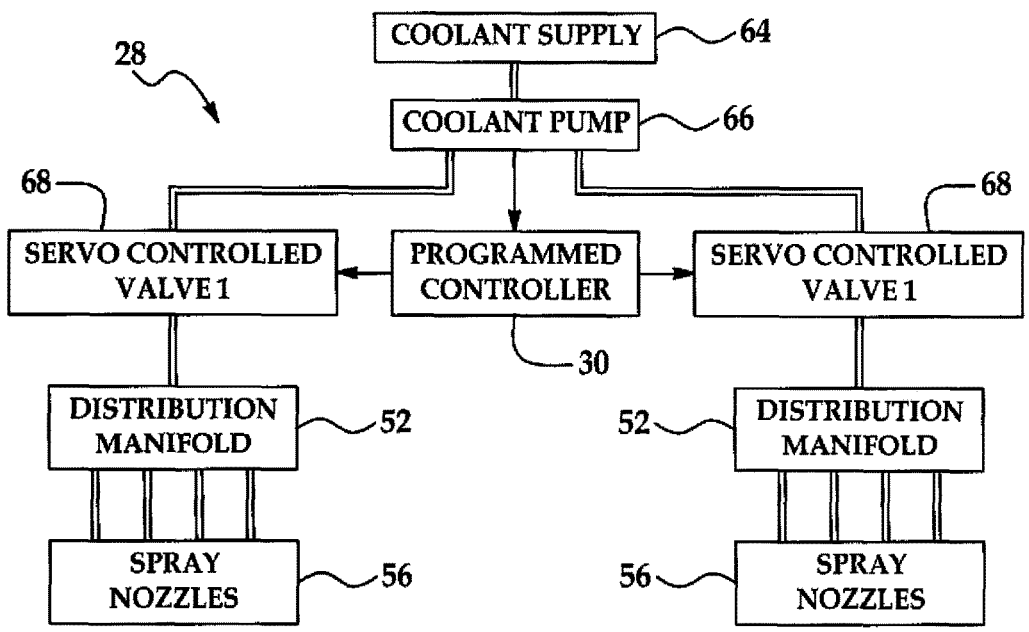
FIG. 13 is an illustration of a block diagram of the cooling system forming part of the apparatus shown in FIG. 1.

Attention is now directed to FIG. 13 which illustrates additional details of one embodiment of a cooling system 28 that may be used to control the temperature of the susceptor 22 within each of the sections 58 shown in FIGS. 10 and 11. A coolant pump 66 pumps coolant fluid from a coolant fluid supply 64 to each of a plurality of servo-controlled valves 68. Each of the valves 68 as well as the coolant pump 66 is controlled by the programmed controller 30. Each of the valves 68 controls the flow of coolant fluid to a corresponding distribution manifold 52 which distributes the fluid to one or more spray nozzles 56 within one of the sections 58 on the susceptor 22. The rate at which the susceptors 22 are cooled may be depend at least in part on the rate at which the coolant fluid is applied to sections 58 of the backside 22b of the susceptors 22, which in turn may be controlled by controller 54.

Figure 14:
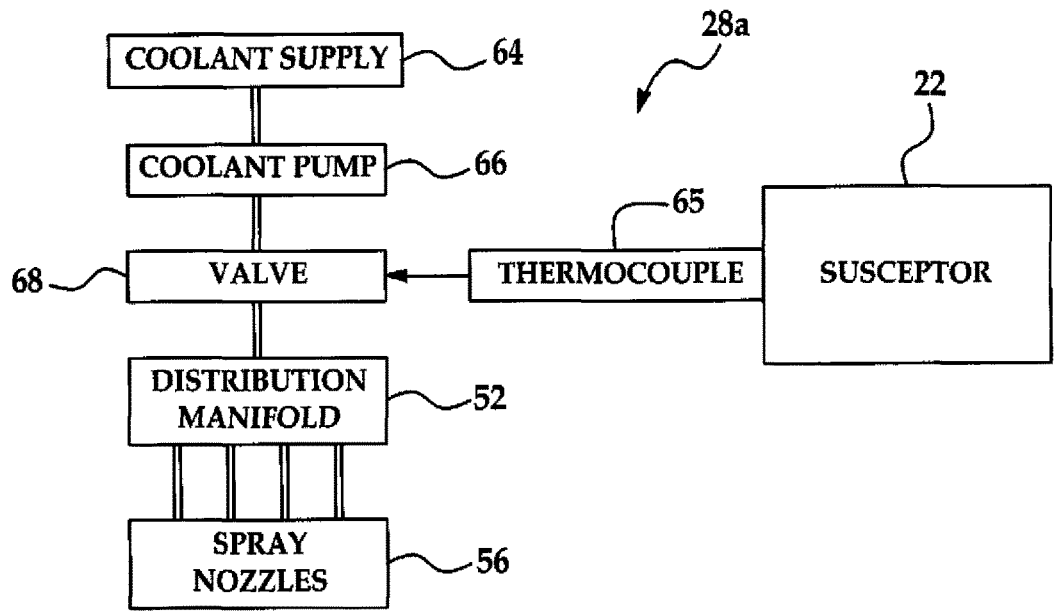
FIG. 14 is an illustration of a block diagram of an alternate form of the cooling system employing thermocouples to control the fluid valves.

FIG. 14 illustrates another embodiment 28a of the cooling system 28 in which thermocouples 65 are connected to the susceptors 22 within each of the sections 58 (FIGS. 11 and 12). Each of the thermocouples 65 functions both as the temperature sensor 26 (FIG. 1) which senses the temperature of the susceptor 22 in a section 58, and as a controller that operates the valve 68 controlling the flow of coolant fluid to nozzles 56 located in the section 58.

Referring now to FIGS. 1 and 13, in operation, the programmed controller 30 controls the induction heating system 24 to heat the susceptors 22 to the desired cure temperature according to a preprogrammed temperature cycle schedule. The temperature sensors 26 sense the temperature of each of the susceptors 22 within each of the sections 58 on the susceptor 22. In the event that the sensed temperature in a section 58 is determined by the controller 30 to be above a preselected temperature exceeding the cure temperature, then the controller 30 activates the coolant pump 66 and energizes one or more of the valves 66 in order to deliver fluid through the corresponding distribution manifold 52 at a controlled rate to those nozzles 56 located within the overheated section 58.

The rate at which the coolant fluid is applied to the susceptors 22 may be determined by the controller 30 based on the sensed temperature in the overheated section 58. Typically, the rate of coolant fluid application may be higher in those sections 58 of the susceptors 22 where the layup is thicker, since the thicker areas may generate more reaction heat requiring removal than the thinner areas. In effect, the disclosed method tailors the cooling applied to the susceptors 22 so as to maintain the susceptors 22, and thus the layup 40, at a desired cure temperature substantially uniformly over substantially the entire area of the susceptor 22. When a section 58 is sufficiently cooled, based on the temperature sensed in that section, the controller 38 closes the valve 68 and turns off the coolant pump 66.

Figure 15:
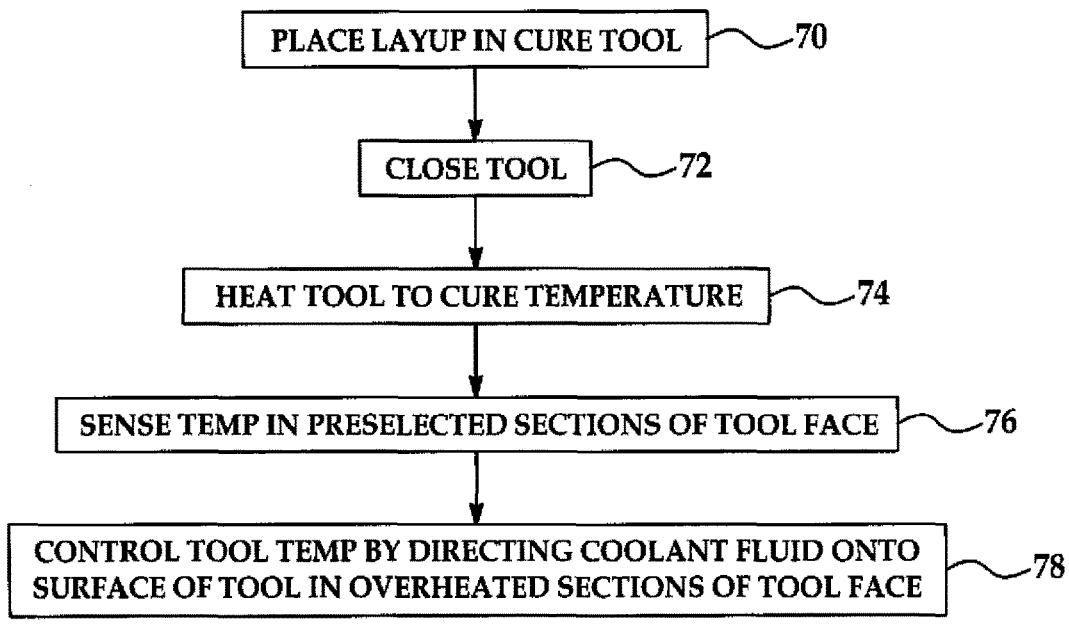
FIG. 15 is an illustration of a flow diagram of a method of curing a composite part layup according to the disclosed embodiments.

FIG. 15 illustrates the overall steps of a method of curing a composite part layup employing the disclosed temperature control system. Beginning at 70, the part layup 40 is placed in a matched set of cure tools 20 used to compress and consolidate the layup 40. The tools 20 are closed at 72 and are heated to the cure temperature at 74. At 76, the temperature of the tools 20 is sensed within each of a plurality of preselected sections 58 on the tool faces 22a. At 78, tool temperature is controlled by directing coolant fluid onto the surface of the tools 20 in those sections 58 where the sensed temperature exceeds the cure temperature by a preselected amount.

Figure 16:
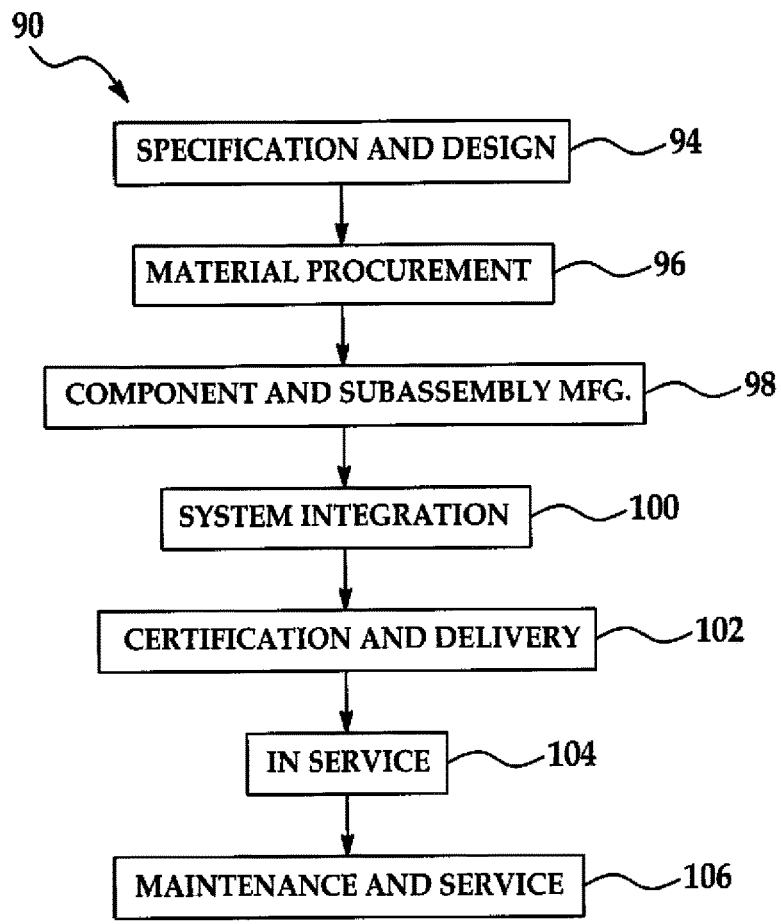
FIG. 16 is an illustration of a flow diagram of aircraft production and service methodology.
Figure 17:
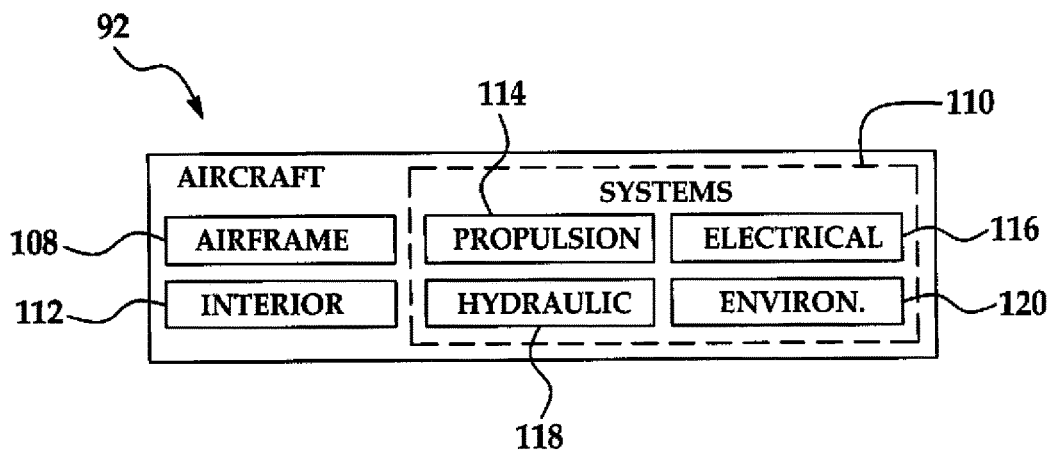
FIG. 17 is an illustration of a block diagram of an aircraft.

Embodiments of the disclosure may find use in a variety of potential applications, particularly in the transportation industry, including for example, aerospace, marine and automotive applications. Thus, referring now to FIGS. 16 and 17, embodiments of the disclosure may be used in the context of an aircraft manufacturing and service method 90 as shown in FIG. 16 and an aircraft 92 as shown in FIG. 17. Aircraft applications of the disclosed embodiments may include, for example, a wide variety of composite components, assemblies and subassemblies. During pre-production, exemplary method 90 may include specification and design 94 of the aircraft 92 and material procurement 96. During production, component and subassembly manufacturing 98 and system integration 100 of the aircraft 92 takes place. Thereafter, the aircraft 92 may go through certification and delivery 102 in order to be placed in service 104. While in service by a customer, the aircraft 92 is scheduled for routine maintenance and service 106 (which may also include modification, reconfiguration, refurbishment, and so on).

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 92 produced by exemplary method 90 may include an airframe 108 with a plurality of systems 110 and an interior 112. Examples of high-level systems 100 include one or more of a propulsion system 114, an electrical system 116, a hydraulic system 118, and an environmental system 120. Any number of other systems may be included. The disclosed method may be employed to fabricate composite components, assemblies or subassemblies used in the interior 112 or on the airframe 108. Although an aerospace example is shown, the principles of the disclosure may be applied to other industries, such as the marine and automotive industries.

Systems and methods embodied herein may be employed during any one or more of the stages of the production and service method 90. For example, composite components, assemblies or subassemblies corresponding to production process 98 may be fabricated or manufactured in a manner similar to components or subassemblies produced while the aircraft 92 is in service. Also, one or more apparatus embodiments, method embodiments, or a combination thereof may be utilized during the production stages 98 and 100, for example, by substantially expediting assembly of or reducing the cost of an aircraft 92. Similarly, one or more of apparatus embodiments, method embodiments, or a combination thereof may be utilized while the aircraft 92 is in service, for example and without limitation, to maintenance and service 106.

Although the embodiments of this disclosure have been described with respect to certain exemplary embodiments, it is to be understood that the specific embodiments are for purposes of illustration and not limitation, as other variations will occur to those of skill in the art.

What is claimed:

1. An apparatus configured to cure a composite part, such that the apparatus comprises:
    a set of tools adapted to hold a composite part layup such that a tool face of a tool of the set of tools comprises a susceptor that comprises a front side that contacts the composite part layup and a backside of the susceptor that comprises a plurality of sections, such that each section comprises, respectively:
    induction coils configured to inductively heat each section of the plurality of sections based upon, respectively, the thickness of the composite part adjacent to the each section; and
    a thermocouple configured as both a temperature sensor for the each section and as a controller configured to, responsive to a heat conducted to the each section from an exothermic reaction in the composite part layup based upon a thickness of the composite part layup adjacent to the each section, control a valve between a coolant pump and a distribution manifold configured to control a flow of coolant fluid to a nozzle located in the each section and configured to impinge the each section at a selected impingement point on the each section.

2. The apparatus of claim 1, further comprising:
    the controller configured to:
    select sections of the tool face to be cooled based on sensed temperatures and a cure temperature, predetermined respectively, for the each section.

3. The apparatus of claim 1, further comprising:
    a plurality of thermocouples coupled with the tool face respectively within the plurality of sections configured to sense a temperature of the tool face in each section of the plurality of sections and configured to control cooling based on sensed temperatures.

4. The apparatus of claim 1, further comprising the nozzle being:
   adapted to be coupled with a source of a coolant fluid for directing the coolant fluid onto the tool face; and
   located between laminations spaced apart from each other and connected to the backside of the susceptor.

5. The apparatus of claim 1, further comprising the controller configured to control a plurality of electrically controlled valves configured to control a flow of a coolant to a plurality of nozzles.

6. The apparatus of claim 1, further comprising a plurality of laminations connected to the backside of the susceptor and spaced apart from each other in a configuration that supports the tool face in a shape that conforms to a desired shape for the composite part.

7. An apparatus configured to cure a part layup that comprises: a composite thermoset resin, and a varied thickness, such that the apparatus comprises:
   a tool that comprises:
      a tool face adapted to contact the part layup; and
      a plurality of spaced apart laminations connected to a side, away from the part layup, of the tool face;
   a heating system that passes transversely through the plurality of spaced apart laminations and configured to heat the tool face to a temperature sufficient to cure the part layup, such that the heating system comprises a susceptor that comprises:
      a first section adjacent to a first thickness of the part layup and a second section adjacent to a second thickness of the part layup;
      a front side that defines the tool face; and
      a backside connected to the plurality of spaced apart laminations; and
   a plurality of sensors, each sensor in the plurality of sensors configured, respectively, to:
      sense the temperature of the tool face within each of a plurality of different sections of the tool face; and
      to control a cooling system configured to cool, based on one of: the first section, and the second section, that comprises a temperature greater than a desired cure temperature for the respective section based upon a first heat and a second heat, respectively, conducted to the first section and second generated from an exothermic reaction of the composite thermoset resin based upon the varied thickness of the part layup, the backside of the susceptor within the first section and the second section on the tool face, such that the cooling system comprises a control valve located between a coolant pump and a manifold connected to a nozzle between the spaced apart laminations, the control valve configured to control a flow rate of a coolant from the nozzle directed onto a selected section on the backside of the susceptor.

8. The apparatus of claim 7, further comprising the cooling system configured to control the cooling system to cool the tool face within selected sections.

9. The apparatus of claim 7, wherein the heating system includes a plurality of electrical induction coils extending transversely through the plurality of spaced apart laminations for inductively heating the susceptor.

10. The apparatus of claim 7, wherein the cooling system comprises:
    a plurality of nozzles respectively associated with each of the plurality of sensors and located in proximity to the backside of the tool face,
    a source of a coolant fluid coupled with each of the nozzles, and
    a plurality of valves operated by the plurality of sensors configured to control a flow of the coolant fluid from the source to each of the plurality of nozzles onto the first section or onto the second section.

11. The apparatus of claim 10,
    further comprising each nozzle of the plurality of nozzles configured to impinge selected impingement points on the backside of the tool face.

12. The apparatus of claim 7, further comprising at least one of the plurality of sensors coupled with the backside of the tool face within each of the sections of the susceptor.

13. An apparatus configured to cure and consolidate a composite part layup that comprises: a varied thickness and a thermosetting resin binder, such that the apparatus comprises:
    a press;
    a set of matched tools mounted in the press, such that a first tool in the set of matched tools comprises first susceptors and a second tool in the set of matched tools comprises second susceptors each comprising, respectively: a contoured tool face that matches the composite part layup, and connected to a backside of the contoured tool face, a set of spaced apart laminations;
    a system, configured to heat the first and second susceptors, that comprises induction coils that pass transversely through the set of spaced apart laminations configured to inductively heat the first and second susceptors to a cure temperature of the composite part layup, such that each of the first and second susceptors respectively comprise, a first section and a second section adjacent to a first thickness and a second thickness of the composite part layup;
    a source of coolant fluid;
    a fluid pump coupled with the source of coolant fluid;
    a plurality of nozzles located between each lamination in the set of spaced apart laminations and each nozzle in the plurality of nozzles adapted to direct coolant fluid onto the respective first and second susceptors based upon a heat generated from an exothermic reaction, of the thermosetting resin binder based upon the varied thickness of the composite part layup, and conducted to the first and second susceptors;
    a set of valves, located between the fluid pump and a manifold connected to selected nozzles in the plurality of nozzles, configured to control a flow of the coolant fluid from the source of coolant fluid to the plurality of nozzles;
    a set of tubes that couple the set of valves with the source of coolant fluid and the nozzles;
    a plurality of sensors configured to sense a temperature, respectively, in each section of the first and second susceptors; and
    a programmed controller configured to:
       determine whether any of the temperatures exceed the cure temperature of the composite part layup by a preselected amount; and
       direct a coolant fluid flow rate, respectively, for each nozzle in each section when the temperature in the each section exceeds the cure temperature by the preselected amount.

14. The apparatus of claim 1, further comprising the set of tools being installed in a press.

15. The apparatus of claim 1, further comprising the set of tools being mounted on plantens of the press.

16. The apparatus of claim 1, further comprising the front side of the susceptor configured to form a portion of a mold cavity for the composite part.

17. The apparatus of claim 1, further comprising the induction coils in each section configured to be connected to the induction coils of another section when the set of tools is in a closed position.

18. The apparatus of claim 7, further comprising the tool being installed in a press.

19. The apparatus of claim 7, further comprising the tool being being mounted on a planten of the press.

20. The apparatus of claim 7, further comprising the tool face configured to form a portion of a mold cavity for the part layup.

* * * * *